US012800311B2

(12) United States Patent
Ducloux

(10) Patent No.: US 12,800,311 B2
(45) Date of Patent: Nov. 17, 2026

(54) FIBRE-OPTIC INTERFEROMETER BASED ON A MONOFREQUENCY LASER SOURCE AND INTERFEROMETRY METHOD CORRECTED FOR PARASITIC REFLECTIONS

(71) Applicants: EXAIL, Saint-Germain-en-Laye (FR); CENTRE NATIONAL D'ETUDES SPATIALES, Paris (FR)

(72) Inventor: Eric Ducloux, Saint-Germain-en-Laye (FR)

(73) Assignees: EXAIL, Saint-Germain-en-Laye (FR); CENTRE NATIONAL D'ETUDES SPATIALES, Paris (FR)

( * ) Notice: Subject to any disclaimer, the term of this patent is extended or adjusted under 35 U.S.C. 154(b) by 308 days.

(21) Appl. No.: 18/576,958

(22) PCT Filed: Jul. 7, 2022

(86) PCT No.: PCT/EP2022/068942
§ 371 (c)(1),
(2) Date: Jan. 5, 2024

(87) PCT Pub. No.: WO2023/280992
PCT Pub. Date: Jan. 12, 2023

(65) Prior Publication Data
US 2025/0102304 A1 Mar. 27, 2025

(51) Int. Cl.
*G01C 19/72* (2006.01)

(52) U.S. Cl.
CPC .................................. *G01C 19/727* (2013.01)

(58) Field of Classification Search
CPC ............................ G01C 19/721; G01C 19/727
See application file for complete search history.

(56) References Cited

U.S. PATENT DOCUMENTS 5,349,441 A 9/1994 Sanders
5,627,644 A * 5/1997 Sanders .............. G01C 19/721 356/464

(Continued)

FOREIGN PATENT DOCUMENTS

EP 1946047 B1 5/2019

OTHER PUBLICATIONS

Ma, Huilian et al. "Development and Evaluation of Optical Passive Resonant Gyroscopes". Journal of Lightwave Technology, vol. 35, vol. 16, Aug. 15, 2017, pp. 3546-3554. (Year: 2017).*

(Continued)

*Primary Examiner* — Michael A Lyons
(74) *Attorney, Agent, or Firm* — NIXON & VANDERHYE

(57) ABSTRACT

This relates to an interferometer including a light generator, a fibre-optic coil, an optical coupler/splitter, a photodetector and an electronic signal-processing system. The light generator includes a laser source able to emit a source beam split into two secondary beams passing through the coil with a travel time τ defining a natural frequency $$f_p = \frac{1}{2\tau}.$$

According to the invention, the laser source is a monofrequency laser source and the light generator includes modulation means designed to modulate the source beam at a modulation frequency equal to $$\frac{2f_p}{2n+1}$$

where n is an integer greater than or equal to 1, and the photodetector and the electronic signal-processing system (Continued)

are configured to acquire and process a signal representative of the interference beam at a demodulation frequency equal $$\frac{f_p}{2n+1}.$$

14 Claims, 3 Drawing Sheets

(56) References Cited

U.S. PATENT DOCUMENTS

| | | | | |
|---|---|---|---|---|
| 9,823,076 | B2 | 11/2017 | Guattari et al. | |
| 2013/0107271 | A1 | 5/2013 | Strandjord et al. | |
| 2016/0231120 | A1 * | 8/2016 | Guattari | G02B 6/29347 |
| 2019/0316907 | A1 * | 10/2019 | Khan | G01C 19/721 |
| 2019/0331492 | A1 * | 10/2019 | Ducloux | G01C 19/721 |

OTHER PUBLICATIONS

He, Yu Ming et al. "Asymmetry Analysis of the Resonance Curve in Resonant Integrated Optical Gyroscopes". Sensors (Basel), Jul. 27, 2019, 19(15):3305. (Year: 2019).*
International Search Report for PCT/EP2022/068942, mailed Sep. 8, 2022, 4 pages.
Written Opinion of the ISA for PCT/EP2022/068942, mailed Sep. 8, 2022, 8 pages.

* cited by examiner

FIBRE-OPTIC INTERFEROMETER BASED ON A MONOFREQUENCY LASER SOURCE AND INTERFEROMETRY METHOD CORRECTED FOR PARASITIC REFLECTIONS

This application is the U.S. national phase of International Application No. PCT/EP2022/068942 filed Jul. 7, 2022, which designated the U.S. and claims priority to FR Patent Application No. 2107356 filed Jul. 7, 2021, the entire contents of each of which are hereby incorporated by reference.

TECHNICAL FIELD

The present invention relates to the technical field of interferometric systems.

More particularly, it relates to an interferometric system of the Sagnac interferometer type comprising an optical fibre loop or coil. Such an interferometric system finds applications in particular in fibre-optic gyroscopes (FOG), electrical current sensor or magnetic field sensor (see "The Fiber-Optic Gyroscope", H. C. Lefèvre, Artech House, Second Edition, 2014).

The invention especially relates to a fibre-optic interferometer based on a laser source, the interferometer being insensitive to the parasitic reflections of the laser source and, and to an interferometric measurement method corrected for the parasitic reflections induced by the laser source.

PRIOR ART

Different types of interferometers exist, which are based on the use of an optical fibre coil. In a conventional interferometer, e.g. for fibre-optic gyroscope, electrical current sensor or magnetic field sensor applications, a source beam is split into two light beams that are each injected at one end of the fibre-optic coil to travel through this latter in counter-propagating directions. After having each travelled once through the coil, the beams are extracted at the two ends of the coil and recombined together to form an interferometric beam.

There also exists a fibre-optic gyroscope of the resonator type (or RFOG) (cf. US2013/0107271). Contrary to a conventional fibre-optic gyroscope, the RFOG comprises a device, e.g. a fibre-optic coupler, that redirects the light beams having already travelled through the optical fibre coil to re-inject them into the coil and make them circulate through the latter, so that they pass several times through the coil. Moreover, the RFOG comprises means to modulate or offset the frequency of each of the counter-propagating beams in order to observe the coil resonance frequency. The resonance frequency corresponds to such a condition that the beams having travelled several times through the coil form constructive interferences at any point of the coil. The RFOG measures an optical frequency difference between the two counter-propagating beams to deduce therefrom a speed of rotation.

The present invention does not relate to an RFOG, but to a conventional fibre-optic interferometer.

In most fibre-optic interferometers, e.g. for current fibre-optic gyroscope applications, the light source is a so-called broadband source, i.e. a source emitting a light beam extending over a spectral band generally between a few nanometres and a few tens of nanometres. For example, the source is conventionally a so-called ASE ("Amplified Spontaneous Emission") source or a so-called SLED ("Superluminescent Light Emitting Diode") source. The use of such sources has, on the one hand, the advantage to limit the undesirable non-linear effects in the fibre, e.g. the Kerr effect, that induce a bias in the measurements, and has, on the other hand, the advantage to limit the parasitic optical interferences and the Rayleigh retro-reflection, which are sources of noise disturbing the measurements.

On the contrary, with a single-frequency source, e.g. a laser source or a laser diode, the parasitic reflections are a significant problem for the FOG noise, due to the long coherence length of a single-frequency source. In this case, a parasitic reflection interferes with the main signal and generates a particularly high noise on the measured power.

In the present document, "single-frequency source, also called "single-mode source", is to be understood as a source that is configured to emit at most 4 longitudinal modes, or also emitting in an emission spectral bandwidth less than or equal to 1 GHz, at each time instant t. The laser diodes, in particular the DFB ("Distributed Feed-Back") diodes, are examples of single-frequency sources. The Fabry-Perot laser diodes, which emit on very few modes, leaving much less powerful secondary modes, are here also considered as sources operating as a single-frequency source.

Although the single-frequency sources have already been contemplated for making interferometers, their use has fallen sharply in favour of broadband sources, in particular due to parasitic interferences generated by the reflections on the interfaces met by the different beams.

One of the objects of the invention is to propose a fibre-optic interferometric measurement system and method based on a single-frequency source and that is insensitive to parasitic reflections.

DISCLOSURE OF THE INVENTION

Obviously, the different features, alternatives and embodiments of the invention can be associated with each other according to various combinations, insofar as they are not incompatible or exclusive with respect to each other.

More precisely, the invention relates to a fibre-optic interferometer comprising a light generator, an optical source splitter, an optical fibre coil, an optical coupler-splitter, a photodetector and an electronic signal-processing system, the light generator comprising a laser source able to emit a source beam, the source splitter being able to transmit the source beam towards the optical coupler-splitter, the optical coupler-splitter being able to split the source beam into two secondary beams and to inject each secondary beam at one end of the optical fibre coil in such a way that the two secondary beams propagate in mutually opposed directions in the optical fibre coil, each secondary beam travelling through the coil with a travel time τ defining a natural frequency of the coil $$f_p = \frac{1}{2\tau},$$

the optical coupler-splitter being able to recombine the two secondary beams at the exit of the optical fibre coil to form an interference beam and the source splitter being able to transmit the interference beam towards the photodetector.

According to the invention, the laser source is configured to emit at most 4 longitudinal modes at each time instant t and in that the light generator comprises modulation means designed to modulate the source beam at a modulation frequency equal to $$\frac{2f_p}{2n+1}$$

where n is a natural integer number greater than or equal to 1, and the photodetector and the electronic signal-processing system are configured to acquire and process a signal representative of the interference beam at a demodulation frequency equal to $$\frac{f_p}{2n+1}.$$

The laser source is configured to emit at most 4 longitudinal modes at each time instant t. Equivalently, the laser source is configured to have a spectral width less than or equal to 1 GHz at each time instant t. In other words, a single-frequency source is used at each time instant t.

According to a first embodiment, the modulation means are designed to modulate the source beam power, in such a way that the source beam has a non-zero power at a time instant t−τ and the source beam has a zero power at the time instants t and t−2τ.

According to a second embodiment, the modulation means are designed to wavelength tune the laser source, in such a way that the laser source emits a first longitudinal mode at a time instant t−τ and at least a second longitudinal mode, distinct from the first longitudinal mode, at the time instants t and t−2τ, and wherein the electronic signal-processing system includes a filter suitable to eliminate a signal detected at a beat frequency between the first longitudinal mode and said at least one second longitudinal mode.

According to a particular aspect of the second embodiment, the modulation means comprise means for adjusting the temperature and/or the electric current of the laser source.

According to a particular aspect of the first or the second embodiment, the modulation means are designed to square modulate the source beam power so that the power value at the point of measurement is equal to twice the average value of the power over a range of duration 2τ about the point of measurement.

In a particularly advantageous manner, the laser source comprises a laser diode, a distributed feedback laser diode or a Fabry-Perot laser, or any other single-frequency optical source able to be modulated directly or by addition of an external modulation. For example, mention can be made to DBR laser diodes, with direct or external filtering.

According to a particular aspect, the interferometer comprises an optical phase modulator configured to modulate a phase difference between the two secondary beams at a phase-modulation frequency equal to $$\frac{f_p}{2n+1}.$$

Advantageously, the optical phase modulator is configured to modulate the phase difference according to a M-state modulation, for each phase-modulation period, where M is an even integer less than or equal to 20.

The invention also relates to an interferometry method comprising the following steps: emitting a source beam comprising at most 4 longitudinal modes at each time instant t; optically splitting the source beam into two secondary beams; injecting each secondary beam at one end of an optical fibre coil in such a way that the two secondary beams propagate in mutually opposed directions in the optical fibre coil, each secondary beam travelling through the coil with a travel time τ defining a natural frequency of the coil $$f_p = \frac{1}{2\tau};$$

optically recombining the two secondary beams at the exit of the optical fibre coil to form an interference beam; detecting the interference beam incident on a photodetector, characterized in that the method comprises a step of modulating the source beam at a modulation frequency equal to $$\frac{2f_p}{2n+1}$$

where n is a natural integer number greater than or equal to 1; the detection of the interference beam being made using a demodulation frequency equal to $$\frac{f_p}{2n+1}.$$

The interferometric method and system of the invention enable to eliminate the parasitic reflection effects in a fibre-optic interferometer based on a single-frequency source.

BRIEF DESCRIPTION OF THE DRAWINGS

Moreover, various other features of the invention emerge from the appended description made with reference to the drawings that illustrate non-limiting embodiments of the invention, and wherein.

It is to be noted that, in these figures, the structural and/or functional elements common to the different alternatives can have the same reference numbers.

DETAILED DESCRIPTION

Figure 1:
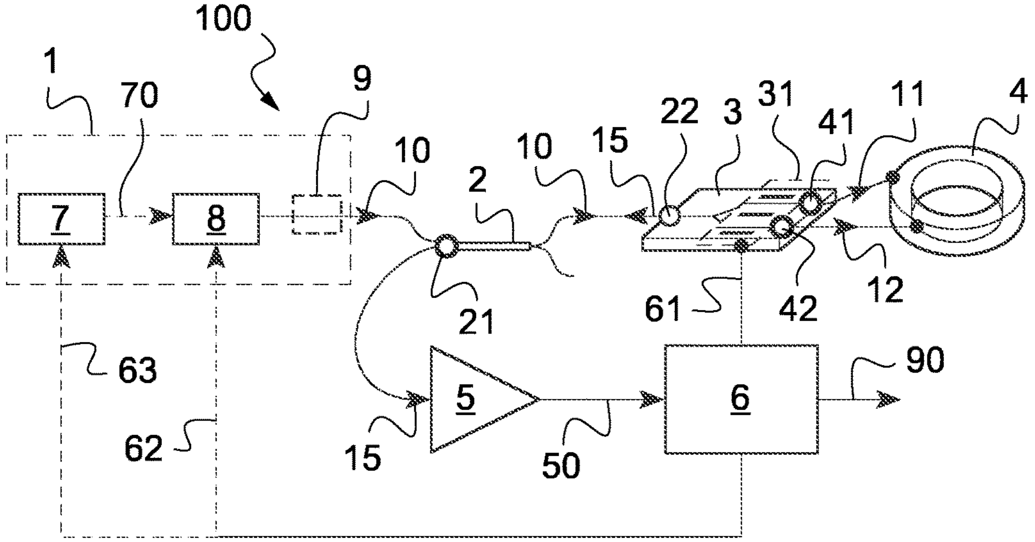
FIG. 1 is a view of an interferometric system according to the invention.

FIG. 1 shows a fibre-optic interferometric system 100 according to an exemplary embodiment. The interferometric system 100 comprises a light generator 1, an optical source splitter 2, an optical fibre coil 4, an integrated optical circuit 3 comprising an optical coupler-splitter and an electrooptical modulator 31, a photodetector 5 and an electronic signal-processing system 6, preferably digital.

The light generator 1 comprises a single-frequency laser source 8 that emits a source beam 10. For example, the single-frequency laser source 8 comprises a DFB laser diode. The light generator 1 also comprises a power supply 7, e.g. a current source, that powers the laser diode. Advantageously, as illustrated in FIG. 1, the laser diode is fibred. The light generator 1 emits the source beam 10 at a source wavelength, λ, e.g. 1550 nm with a spectral width of 10 MHz, over at most 4 longitudinal modes. Such a single-frequency source has a very long coherence length, of the order of 50 m, but which however remains lower than the optical length of the coil. The light power emitted by the source, or source power P0 in the present document, is generally constant and between 0.2 mW and 20 mW. The single-frequency laser source 8 is generally a strongly polarized source. The polarization management is conventionally taken into account in the interferometer, but is not shown in the figures, to avoid making the description too long.

The optical source splitter 2 is for example a fibre-optic 2×2 coupler or a circulator. As an alternative, the optical source splitter 2 comprises an integrated optical waveguide device. The optical source splitter 2 receives the source beam 10 and transmits it towards the integrated optical circuit 3 via a single-mode optical fibre.

In the example shown, the integrated optical circuit 3 includes an optical coupler-splitter formed by an integrated waveguide Y-junction on a flat substrate. Advantageously, the flat substrate is made of lithium niobate or consisted of a glass-niobate hybrid assembly. In the example illustrated in FIG. 1, electrodes are deposited along the two secondary branches of the Y junction to form an optical phase modulator 31. The main branch of the Y junction is connected for example via an optical fibre to the exit of the source splitter 2. Advantageously, the main branch of the Y-junction forms a waveguide polarizer that linearly polarizes the source beam 10. Each of the two secondary branches of the Y-junction is connected to an end 41, 42 of the optical fibre coil 4.

The optical coupler-splitter receives the source beam 10 and splits it into two secondary beams 11, 12. The secondary beams 11, 12 are also linearly polarized. Each secondary beam 11, respectively 12, is injected at one end 41, respectively 42, of the optical fibre coil 4. That way, the two secondary beams 11, 12 propagate in mutually opposed directions in the optical fibre coil 4. Each secondary beam 11, 12 travels through the coil once with a travel time τ. The natural frequency, fp, of the coil is defined according to the known formula fp=½τ. The optical coupler-splitter recombines the two secondary beams 11, 12 at the exit of the optical fibre coil 4 to form an interference beam 15. The interference beam 15 propagates from the main branch of the Y-junction towards the optical source splitter 2.

In the return direction, the optical source splitter 2 transmits the interference beam 15 to the photodetector 5. The photodetector 5 detects a signal representative of the interference beam 15 power as a function of time.

A signal-processing system 6 records the detected signal, which is digitized. The signal-processing system 6 controls the voltage applied to the terminals of the optical phase modulator 31 electrodes. The signal-processing system 6 is also used to control the laser source power and/or to adjust the source beam 10 wavelength, as described in detail hereinafter in relation with the first and second embodiments.

In FIG. 1, the interface areas liable to generate parasitic reflections are represented by circles 21, 22, 41, 42. It is observed that the parasitic reflections mainly occur on the interfaces relatively close to the laser source 8. The optical fibre coil length is generally of several hundreds of metres or several kilometres. As indicated hereinabove, the travel time of the light waves in the coil is referred to as τ. The reflection point 21 is located at the input interface on the optical source splitter 2. The reflection point 22 is located at the input interface of the integrated waveguide forming the main branch of the Y-junction. The reflection points 41 and 42 are located, respectively, at the interface between each secondary branch of the Y-junction and the corresponding end of the optical fibre coil 4. Each reflection point 21, 22, 41, 42 contributes to a parasitic reflection.

Compared to the coil length, the distance between the laser source 8 and each reflection point 21, 22, 41, 42 is very small. By simplification in the following of the description, it is considered here that the laser source 8 and the parasitic reflection areas are almost all at the same point.

That way, the photodetector 5 receives simultaneously, at a time instant t, the three following contributions: the main signal coming from the above-described interference beam 15, corresponding to the source beam emitted at a time instant t−τ, having travelled (after optical splitting) through the whole optical fibre coil before being recombined and transmitted to the photodetector 5; a direct reflection corresponding to the source beam emitted at the time instant t and that is reflected on the reflection points 21, 22, 41, 42, without passing through the optical fibre coil, to directly come back on the photodetector 5; and a reflection from the coil corresponding to the source beam emitted at the time instant t−2τ, which has travelled a first time through the optical fibre coil, then has been reflected on an interface (on the reflection points 21, 22, 41, 42), to form a parasitic reflected signal propagating a second time in the optical fibre coil, before being transmitted to the photodetector 5.

An observation which is part of the present disclosure is that, in a conventional interferometric system with a continuously emitting single-frequency source, the main signal and the parasitic reflection signals are received simultaneously by the photodetector while being emitted at different time instants from each other.

Figure 2:
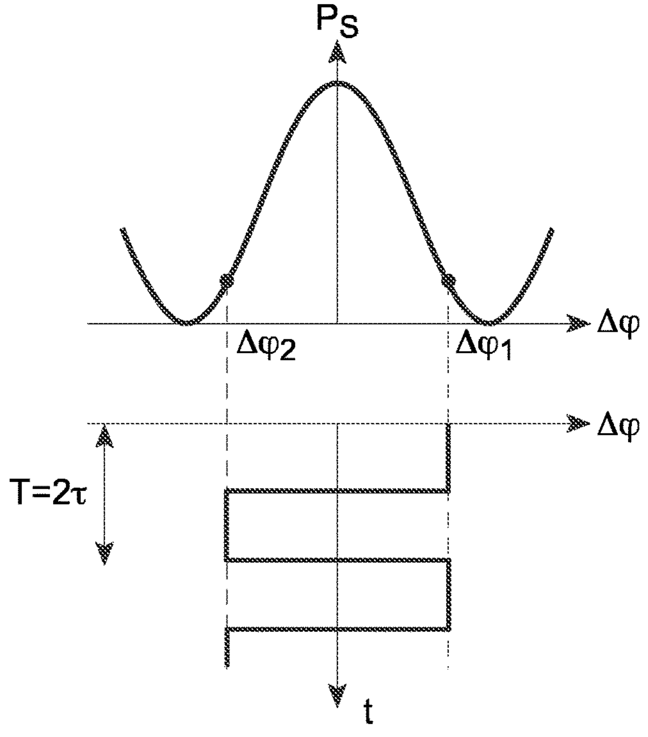
FIG. 2 illustrates an example of interferometer phase-shift measurement with a two-state phase modulation.

For the sake of clarity, it is assumed that the modulation applied to the optical phase modulator 31 is a two-state modulation, illustrated in FIG. 2. This phase modulation is periodic and at the natural frequency fp. However, a 4-state, 6-state, 8-state modulation or more is conceivable without departing from the framework of the present disclosure.

The conventional operation of a fibre-optic interferometric system based on a single-frequency laser source, with a two-state phase modulation, will now be briefly described.

For the two-state modulation, a modulated electric voltage $V_m(t)$ is applied between the electrodes of the optical phase modulator 31 to modulate the phase difference $\Delta\Phi_m(t)$ of the interferometric signal measured. This modulation provides a biasing that increases the interferometric system sensitivity, in particular for low-amplitude rotation measurements. More precisely, the optical phase modulator 31 generates a phase-shift $\Phi_m(t)$ on each secondary beam 11 and 12. A modulation of the phase difference $\Delta\Phi_m(t)$ is thus obtained, according to the following equation.

$$\Delta\Phi_m(t)=\Phi_m(t)-\Phi_m(t-\tau) \quad \text{[Math 1]}$$

This modulation of the phase-shift $\Phi_m(t)$ is obtained by applying a modulated electric voltage 61 $V_m(t)$ to the electrodes of the optical phase modulator 31.

It is observed that the phase-shift modulation at the frequency of repetition fp or of period 2τ implies that the phase differences are exactly opposed (or have an alternating symmetry) at τ of difference, as in the following equation.

$$\Delta\Phi_m(t+\tau) = \Phi_m(t+\tau) - \Phi_m(t+\tau-\tau) = \Phi_m(t-\tau) - \Phi_m(t) = -\Delta\Phi_m(t) \quad \text{[Math 2]}$$

The alternating symmetry of the modulation appears in FIG. 2, which shows a symmetrical phase difference as a function of time. This alternating symmetry is verified whatever the configuration of the electrodes: two push-pull electrodes or a single electrode on one arm of the optical phase modulator 31.

In particular, it is known to apply a so-called 2-state modulation, by square modulating the modulation voltage $V_m$ between two step values, in order to produce a modulation of the phase difference, called biasing phase difference, on two symmetrical levels $\Delta\varphi_1$ and $\Delta\varphi_2$. For example, with a laser source, a modulation $\Delta\Phi_b(t)=\pm 3\pi/4$ is applied. The 2-state modulation is applied at the natural frequency $f_p$ of the optical fibre coil. The natural frequency $f_p$ is defined in such a way that $T/2=1/(2\cdot f_p)=\tau$ where T represents the period of the square modulation. Thus, the half-period of modulation T/2 corresponds to the difference of propagation time τ between the long optical path passing through the coil and the short optical path that connects the optical phase modulator 31 to the optical coupler-splitter 3.

At the top of FIG. 2 is shown the power $P_S$ of the interferometric signal detected as a function of the phase-shift Δφ between the two secondary beams propagating in mutually opposed directions in the coil. The modulation of the two-state phase difference as a function of time has also been shown. A modulation voltage is applied to the terminals of the optical phase modulator 31 electrodes, in such a way as to modulate the phase difference between the two secondary beams between two symmetrical levels $\Delta\varphi_1$ and $\Delta\varphi_2$.

Figure 3:
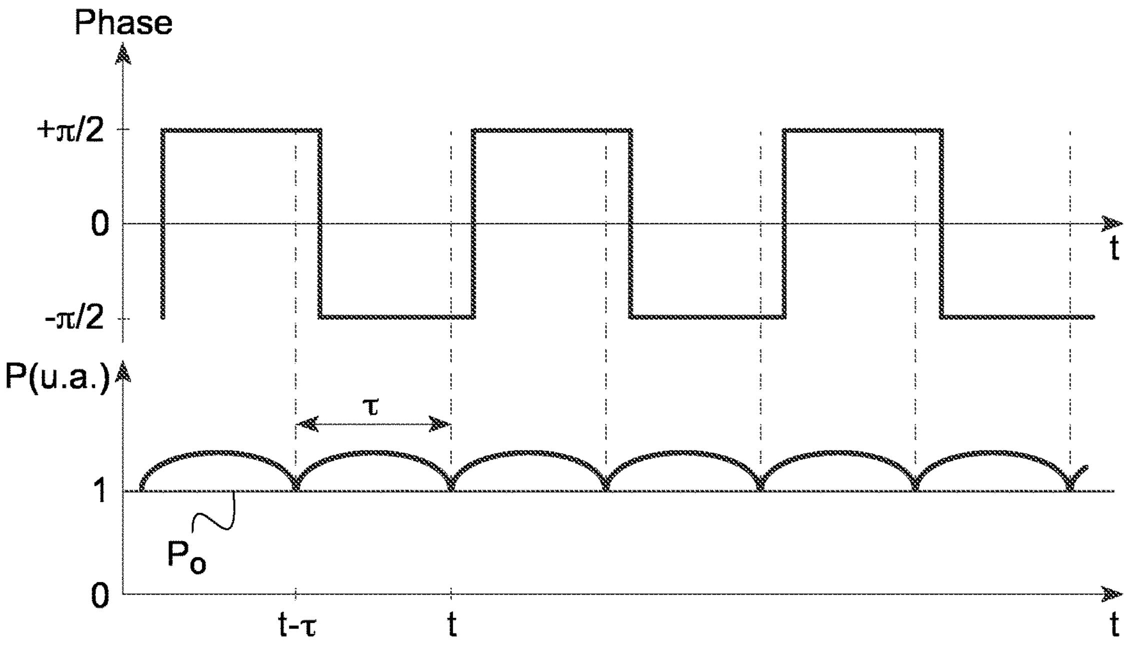
FIG. 3 illustrates a conventional example of interferometric phase-shift measurement with the two-state phase modulation.

At the top of FIG. 3 is shown an example of modulation of the two-state phase difference as a function of time, and at the bottom of the figure is shown the power P0 of the laser source, as well as the detection time instants t and t−τ. The power P0 of the laser source is supposed to be constant. The curve lines illustrate the link between the laser signal emitted at the time instant t−τ and the main interferometric signal detected at the time instant t when only the main signal is considered.

As illustrated in FIG. 3, the detection system 5 acquires the power Ps of the interferometer beam at the exit of the interferometer at time instants t and t−τ in the two modulation states, here at ±π/2. The signal-processing system 6 digitizes the detected interferometric beam and demodulates at $f_p$ the detected signal by sampling two power measurements on each modulation period and by allocating a negative signal to a first level and a positive signal at the following level. This modulation-demodulation scheme based on a square modulation voltage generating 2 states at the frequency $f_p$ makes it possible to obtain a better sensitivity of the interferometric system and a better stability of the measurements about zero, independently of the output power Ps variations.

In an interferometer of the prior art, with a two-state phase modulation, the power of the source $P_0$ is generally constant as a function of time. In FIG. 3, the source power $P_0$ is normalized to 1. The interferometric signal is acquired at the time instants t and t−τ, at each modulation period.

However, as indicated hereinabove, as the single-frequency source emits continuously, the main signal and the parasitic reflection signals are received simultaneously by the photodetector while being each emitted at different time instants.

Two embodiments will now be described, which enable to eliminate the contribution of the parasitic reflections in the detected signal.

Figure 4:
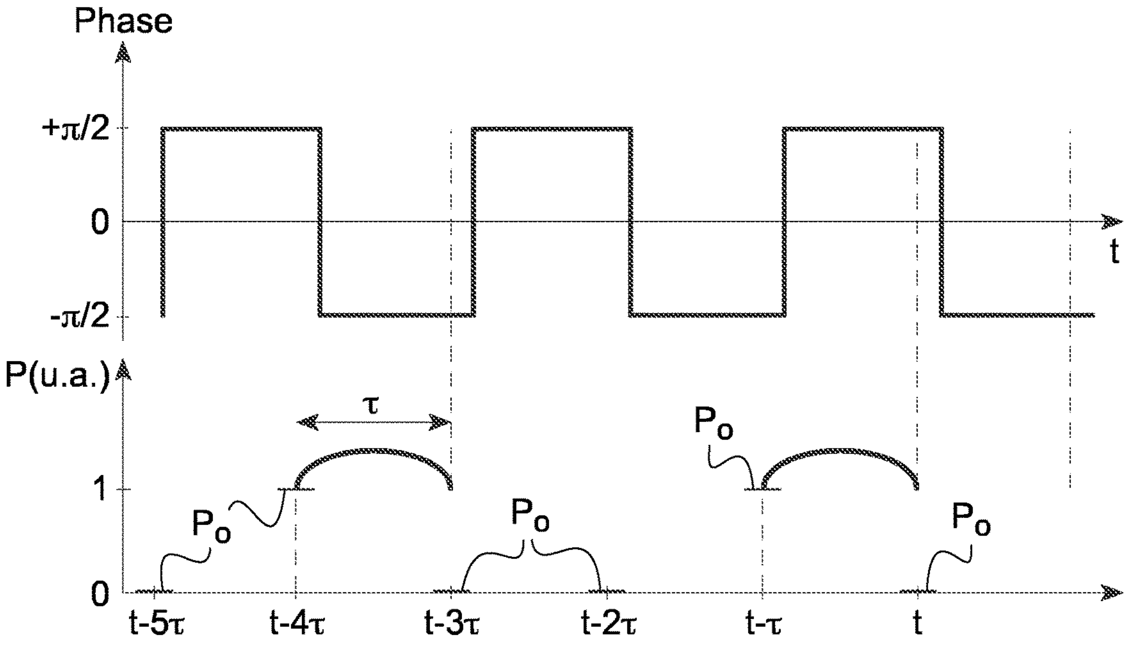
FIG. 4 is a first example of modulation of the source beam according to the present disclosure and of interferometric phase-shift measurement with the two-state phase modulation.

FIG. 4 illustrates the operation of an interferometer based on a single-frequency source, and with a two-state phase modulation, according to an example of the first embodiment.

In this first embodiment, instead of emitting a continuous source beam of constant power, the intensity or the power of the source beam 10 is modulated. On the one hand, the light generator 1 is configured in such a way that the single-frequency laser source 8 emits the source beam 10 of non-zero power $P_0$ at the time instant t−τ. On the other hand, the light generator 1 is configured in such a way that the source beam 10 has a zero power $P_0$ at the time instants t−2τ. Advantageously, the source beam 10 is modulated at a frequency equal to 2fp/(2n+1), where n is a natural integer number higher than or equal to 1. Preferably, the source beam 10 has a frequency equal to 2fp/3 (in other words n=1). The duration of the source signal at P0=1 is generally about τ/2 without thereby being limited to this value. The emitted power pattern of the light source is not necessarily defined on the other times and can be arbitrary.

In this first embodiment, the two-state phase modulation remains at the natural frequency fp. The signal-processing system 6 digitizes the detected interferometric beam and demodulates the detected signal at the frequency fp/(2n+1), here fp/3, by sampling two power measurements over three phase modulation periods.

In FIG. 4, the source beam 10 is here power-modulated at the frequency 2fp/3. The power $P_0$ of the source beam 10 is equal to 1 (in arbitrary units) at the time instants t−τ and t−4τ. The duration of each high level (at 1) of power P0 is here for example of the order of τ. The power $P_0$ of the source beam 10 is zero at the time instants t, t−2τ, t−3τ and t−5τ. Moreover, the interferometric signal is phase-modulated, with a two-state modulation, at the frequency fp. The detected signal is demodulated at the frequency fp/3. More precisely, the interferometric signal is detected at the time instants t and t−3τ. In FIG. 4, the curve lines illustrate the link between the laser signal emitted at the time instant t−τ, respectively t−4τ, and the main interferometric signal detected at the time instant t, respectively t−3τ. The interferometric signal detected at the time instant t corresponds effectively to the source beam emitted at the time instant t−τ, of power equal to 1 (u.a.). The parasitic signals liable to be detected at the time instant t and that correspond to the source beam 10 emitted at the time instant t or t−2τ are zero, because the power of the source beam emitted at the time instants t and t−2τ is zero. Likewise, the interferometric signal detected at the time instant t−3τ corresponds to the source beam emitted at the time instant t−4τ, of power equal to 1 (u.a.). The parasitic signals liable to be detected at the time instant t−3τ and that correspond to the source beam 10 emitted at the time instant t−3τ or t−5τ are zero, because the power of the source beam emitted at the time instants t−3τ and t−5τ is zero.

The signal detected at the time instant t corresponds to the high modulation state, e.g. +π/2. The signal detected at the time instant t−3τ corresponds to the low modulation state, e.g. −π/2. The two phase-shift states are effectively measured with this modulation/demodulation scheme.

In this example of the first embodiment, the source beam 10 is power-modulated on two different levels (0 and 1, a.u.). For that purpose, the laser source 8 can be modulated directly via a signal 62, or via a modulation 63 of the current source 7 that powers the laser diode 8 for the laser diode to emit pulses. As an alternative, the laser diode 8 emits continuously and an external optical modulator 9, of the Mach-Zehnder type, is arranged downstream from the laser diode 8 to modulate the power of the source beam 10.

According to a particular aspect of the first embodiment, the power of the source beam 10 is square modulated with a square step at P0=1 of duration close to or equal to τ so that the power value at the point of measurement is equal to twice the average value of the power over a range of duration 2τ about this point of measurement. This particular configuration further makes it possible to attenuate or even eliminate the harmful Kerr effects liable to appear in the optical fibre with a single-frequency laser source.

In the example illustrated in FIG. 4 of the first embodiment, the phase modulation is at fp, whereas the source power modulation is at 2fp/3. The demodulation of the detected signal is at fp/3. The whole modulation/demodulation scheme is thus at fp/3.

The first embodiment has several advantages. Firstly, this source power modulation scheme enables the total elimination of the interferometric parasitic reflection. It enables the elimination of the local interferometers (of the Michelson type) measured by the interferometric system, e.g. for a FOG or electrical current sensor or magnetic field sensor application and sources of problems. Finally, it enables to eliminate potential disturbances of the source by parasitic feedback, which allows eliminating the need for an optical isolator (or optical circulator) between the laser source 8 and the source splitter 2.

Compared to the conventional configuration of the modulation and demodulation at the frequency fp, it is observed that there is no longer any crossover between emission and reception in this first embodiment. However, it remains only 2 points of measurement at the frequency fp/3, whereas there are 6 points of measurement in the conventional configuration. This first embodiment has thus the disadvantage to increase the measurement noise by a factor √3.

This first embodiment is thus advantageous when the noise reduction generated by the parasitic reflections is greater than the noise increase coming from the change of sampling, or when one of the other advantages indicated hereinabove is significant enough.

This first embodiment can be generalized to a 4-state, 6-state, 8-state or 12-state or 20-state phase modulation, without departing from the framework of the present disclosure. More generally, the invention applies to any M-state phase modulation, where M is an even integer less than or equal to 20.

Figure 5:
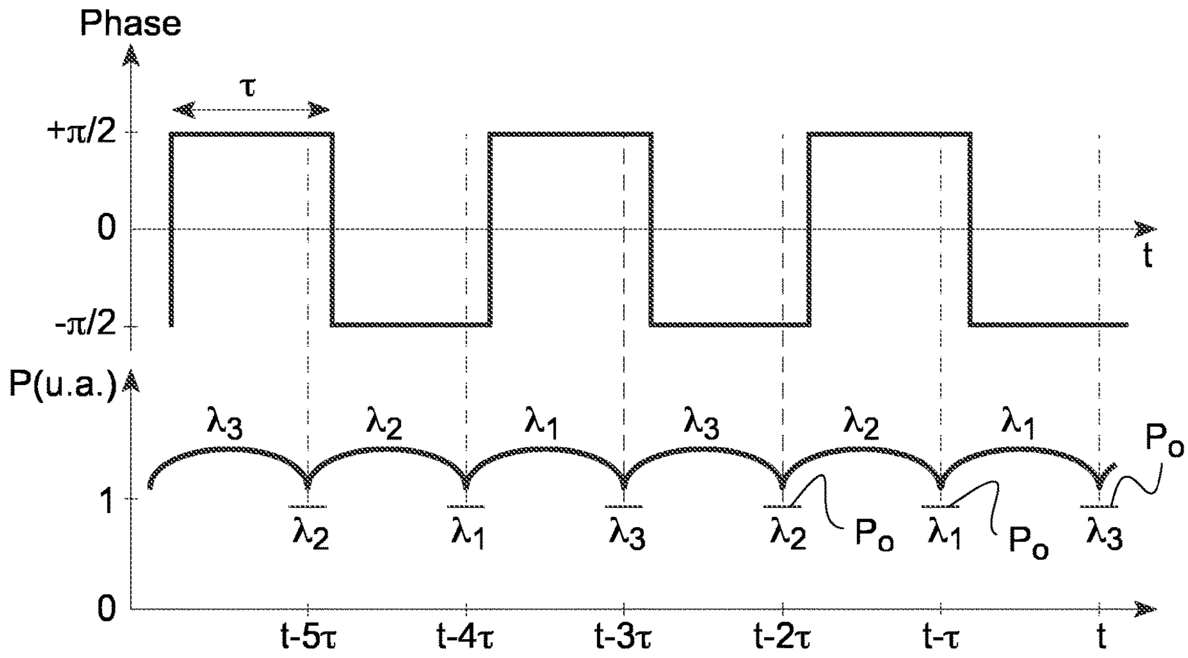
FIG. 5 is a second example of modulation of the source beam according to the present disclosure and of interferometric phase-shift measurement with the two-state phase modulation.

FIG. 5 illustrates the operation of an interferometer based on a single-frequency source, and with a two-state phase modulation, according to an example of the second embodiment.

In this second embodiment, instead of emitting a single-frequency source beam of constant wavelength, the wavelength of the source beam 10 is modulated with a modulation frequency. However, at each time instant of the phase modulation period, the source beam remains single-frequency. In other words, the source emits only one wavelength at a time. In this second embodiment, the source beam 10 is modulated in wavelength (or optical frequency) at a frequency equal to 2fp/(2n+1), where n is a natural integer number higher than or equal to 1. Preferably, the source beam 10 is wavelength modulated at a frequency equal to 2fp/3 (in other words n=1). Therefore, for example, the light generator 1 is configured so that the laser source 8 emits the source beam 10 at a first wavelength $\lambda_1$ at the time instant t−τ (modulo 3τ), at a second wavelength $\lambda_2$ at the time instant t−2τ (modulo 3τ) and at a third wavelength $\lambda_3$ at the time instant t (modulo 3τ). The minimum difference between each pair of optical frequencies corresponding to the wavelengths $\lambda_1$, $\lambda_2$ and $\lambda_3$ is of 100 MHz, to be above the power measurement bandwidth, with a duration of emission of each wavelength ($\lambda_1$, $\lambda_2$ and $\lambda_3$) about τ/2. The wavelength of the source beam is not necessarily defined on the other times and can be arbitrary. The source can emit continuously. As an alternative, the source emits pulses at the different wavelengths.

In this second embodiment, the phase modulation, e.g. of the two-state type, remains at the natural frequency fp. The signal-processing system 6 digitizes the detected interferometric beam and demodulates the detected signal at the frequency here fp/3 by sampling six power measurements over three phase modulation periods, thus with a sampling corresponding to the conventional approach.

In this second embodiment, the source beam 10 is here modulated in wavelength, e.g. via a modulation of the electric current 70 generated by the current source 7 that powers the laser diode 8. The constraint of cancelling the source beam power at a measurement time instant is here not necessary, unlike in the first embodiment. In this second embodiment, the wavelength of the source beam 10 is modulated at the frequency 2fp/3 as indicated hereinabove. That way, emission and detection are never simultaneously at the same wavelength. At the time instant t−τ (modulo 3τ), a signal, which is detected at the time instant t, is emitted at the first wavelength ki. At the time instant t−2τ (modulo 3τ), a signal, which is detected at the time instant t−τ, is emitted at the second wavelength $\lambda_2$. At the time instant t or t−3τ (modulo 3τ), a signal, which is detected at the time instant t−2τ, is emitted at the third wavelength $\lambda_3$.

In this second embodiment, the detected signal is demodulated at the frequency fp. More precisely, the interferometric signal is detected at the time instants t, t−τ, t−2τ, t−3τ, t−4τ and t−5τ and a demodulation scheme is applied, which is a duplication of the demodulation scheme at fp, thus +−+−+− in the present case.

The interferometric signal detected at the time instant t corresponds effectively to the source beam emitted at the first wavelength at the time instant t−τ. The parasitic signals liable to be detected at the time instant t and that correspond to the source beam 10 emitted at the third wavelength at the time instant t and/or to the source beam 10 emitted at the second wavelength at the time instant t−2τ generate parasitic interferences at a high beat frequency, corresponding to the optical frequency difference, which is easily electronically filtered. For a source wavelength difference of 1 pm, the optical frequency difference is higher than 100 MHz.

Likewise, the interferometric signal detected at the time instant t−3τ corresponds to the source beam emitted at the first wavelength at the time instant t−4τ. The parasitic signals liable to be detected at the time instant t−3τ and that correspond to the source beam 10 emitted at the third wavelength at the time instant t−3τ and/or to the second wavelength at the time instant t−5τ are also electronically filtered at the beat frequency.

The interferometric signal detected at the time instant t−τ corresponds to the source beam emitted at the second wavelength at the time instant t−2τ. The parasitic signals liable to be detected at the time instant t−τ and that correspond to the source beam 10 emitted at the first wavelength at the time instant t−τ and/or to the third wavelength at the time instant t−3τ are also electronically filtered at the beat frequency.

The interferometric signal detected at the time instant t−2τ corresponds to the source beam emitted at the third wavelength at the time instant t−3τ. The parasitic signals liable to be detected at the time instant t−2τ and that correspond to the source beam 10 emitted at the second wavelength at the time instant t−2τ and/or to the first wavelength at the time instant t−4τ are also electronically filtered at the beat frequency.

The interferometric signal detected at the time instant t−4τ corresponds to the source beam emitted at the second wavelength at the time instant t−5τ. The parasitic signals liable to be detected at the time instant t−4τ and that correspond to the source beam 10 emitted at the first wavelength at the time instant t−4τ and/or to the third wavelength at the time instant t−6τ are also electronically filtered at the beat frequency.

The interferometric signal detected at the time instant t−5τ corresponds to the source beam emitted at the third wavelength at the time instant t−6τ. The parasitic signals liable to be detected at the time instant t−5τ and that correspond to the source beam 10 emitted at the second wavelength at the time instant t−5τ and/or to the first wavelength at the time instant t−7τ (modulo 6τ, in other words at t−τ) are also electronically filtered at the beat frequency.

In FIG. 5, the signal detected at the time instants t, t−2τ and t−4τ corresponds to the low modulation state, e.g. −π/2. The signal detected at the time instants t−τ, t−3τ and t−5τ corresponds to the high modulation state, e.g. +π/2. The two phase-shift states are effectively measured with this modulation/demodulation scheme.

In this second embodiment, the source is modulated with a periodicity of 2fp/3. The basic periodicity of the whole modulation/demodulation scheme is thus here also of fp/3.

The second embodiment has the advantage to totally eliminate, by electronic filtering, the interferometric parasitic reflection. Moreover, the second embodiment does not induce degradation of the measurement noise due to sampling failure. Moreover, this modulation/demodulation scheme enables the source isolation to be maintained under certain conditions, without the need for an optical isolator.

However, this second embodiment has drawbacks. First, it does not enable to eliminate the effect of the local interferometers (of the Michelson type), which may be significant for the interferometric system, e.g. for a FOG or electrical current sensor or magnetic field sensor application. Moreover, it requires an additional means for varying the source beam wavelength between the emissions at the different time instants.

Let's consider the case of a laser source 8 of the DFB laser type. Various examples are given here to illustrate the implementation of the second embodiment.

According to a first example, the electric power is modulated via the injection of the electric current 70 that powers the DFB laser diode to vary the wavelength of the emitted source beam. A current variation of the order of 1 mA easily enables a sufficient wavelength offset because it corresponds to an optical frequency difference of several hundreds of MHz on standard DFB lasers.

In a second example, the cyclic ratio (in other words, the duration of the source pulses successively emitted) is modulated, in order to modify the warming of the DFB laser diode and the emission wavelength. A variation of 5% of the pulse duration (for step durations of about 1 s) between the pulses emitted at the time instants t, t−r, t−2τ enables in practice to obtain a beat between the wavelengths far greater than 100 MHz.

In a third example, the pulses emitted successively are offset. In each pulse, the temperature increase effect enables varying the wavelength of the source beam emitted. The successive pulses being offset relative to each other, different wavelengths are thus obtained at the time instants considered for the measurement. For reasons very similar to those used in the previous example, an offset of 5% of the pulse duration (for step durations of about 1 s) between the pulses emitted at the time instants t, t−r, t−2τ enables in practice to obtain a beat between the wavelengths far greater than 100 MHz.

According to a particular aspect of the second embodiment, the power of the source beam 10 is square modulated with a square step at P0=1 of duration close to or equal to τ/2 so that the power value at the point of measurement is equal to twice the average value of the power over a range of duration 2τ about this point of measurement. This particular configuration further makes it possible to attenuate or even eliminate the harmful Kerr effects liable to appear in the optical fibre with a single-frequency laser source.

The first and second embodiments are here described within the framework of a two-state phase modulation at the frequency fp. However, the person skilled in the art will apply without difficulty the principle of the invention to a 4-state phase modulation or more.

FIGS. 4 and 5 illustrate exemplary embodiments with a modulation of the source beam (in power or in wavelength) at a frequency 2fp/3.

More generally, the invention applies to any phase-shift modulation pattern at a frequency fp/(2n+1) with an alternating symmetry, combined with a modulation of the source (in terms of power and/or wavelength) at the frequency 2fp/(2n+1), with n a positive integer higher than or equal to 1.

Of course, various other modifications can be made to the invention within the scope of the appended claims.

The invention claimed is:

1. A fibre-optic interferometer comprising:
a light generator,
an optical source splitter,
an optical fibre coil,
an optical coupler-splitter, a photodetector and an electronic signal-processing system,
the light generator comprising a laser source able to emit a source beam,
an optical phase modulator (31) configured to modulate a phase difference between the two secondary beams at a phase-modulation frequency equal to $$\frac{f_p}{2n+1},$$

the source splitter being able to transmit the source beam towards the optical coupler-splitter, the optical coupler-splitter being able to split the source beam into two secondary beams and to inject each secondary beam at one end of the optical fibre coil in such a way that the two secondary beams propagate in mutually opposed directions in the optical fibre coil, each secondary beam travelling through the coil with a travel time τ defining a natural frequency of the coil $$f_p = \frac{1}{2\tau},$$

the optical coupler-splitter being able to recombine the two secondary beams at the exit of the optical fibre coil to form an interference beam, the source splitter being able to transmit the interference beam towards the photodetector, wherein the laser source comprises a single-frequency laser source configured to emit at most 4 longitudinal modes at each time instant t, wherein the light generator comprises modulation means designed to modulate the source beam at a modulation frequency equal to $$\frac{2f_p}{2n+1}$$

where n is a natural integer number greater than or equal to 1, and wherein the photodetector and the electronic signal-processing system are configured to acquire and process a signal representative of the interference beam at a demodulation frequency equal to $$\frac{f_p}{2n+1}.$$

2. The fibre-optic interferometer according to claim 1, wherein the modulation means are designed to modulate the source beam power in such a way that the source beam has a non-zero power at a time instant t−τ and the source beam has a zero power at the time instants t and t−2τ.

3. The fibre-optic interferometer according to claim 2, wherein the modulation means comprise an optical modulator arranged between the laser source and the source splitter, the optical modulator being configured to modulate the power of the source beam.

4. The fibre-optic interferometer according to claim 3, wherein the modulation means are designed to square modulate the power of the source beam so that the power value at the point of measurement is equal to twice the average value of the power over a range of duration 2τ about the point of measurement.

5. The fibre-optic interferometer according to claim 2, wherein the modulation means are designed to square modulate the power of the source beam so that the power value at the point of measurement is equal to twice the average value of the power over a range of duration 2τ about the point of measurement.

6. The fibre-optic interferometer according to claim 2, wherein the laser source comprises a laser diode, a distributed feedback laser diode or a Fabry-Pérot laser.

7. The fibre-optic interferometer according to claim 1, wherein the modulation means are designed to wavelength tune the laser source in such a way that the laser source emits a first longitudinal mode at a time instant t−τ and at least a second longitudinal mode, distinct from the first longitudinal mode, at the time instants t and t−2τ, and wherein the electronic signal-processing system includes a filter suitable to eliminate a signal detected at a beat frequency between the first longitudinal mode and said at least one second longitudinal mode.

8. The fibre-optic interferometer according to claim 7, wherein the modulation means comprise means for adjusting the electric current of the laser source.

9. The fibre-optic interferometer according to claim 7, wherein the modulation means are designed to square modulate the power of the source beam so that the power value at the point of measurement is equal to twice the average value of the power over a range of duration 2τ about the point of measurement.

10. The fibre-optic interferometer according to claim 7, wherein the laser source comprises a laser diode, a distributed feedback laser diode or a Fabry-Pérot laser.

11. The fibre-optic interferometer according to claim 1, wherein the modulation means are designed to square modulate the power of the source beam so that the power value at the point of measurement is equal to twice the average value of the power over a range of duration 2τ about the point of measurement.

12. The fibre-optic interferometer according to claim 1, wherein the laser source comprises a laser diode, a distributed feedback laser diode or a Fabry-Pérot laser.

13. The fibre-optic interferometer according to claim 1, wherein the optical phase modulator is configured to modulate the phase difference according to a M-state modulation, for each phase-modulation period, where M is an even integer less than or equal to 20.

14. An interferometry method comprising the following steps:

emitting, by a single-frequency laser source, a source beam comprising at most 4 longitudinal modes at each time instant t;

optically splitting the source beam into two secondary beams;

injecting each secondary beam at one end of an optical fibre coil in such a way that the two secondary beams propagate in mutually opposed directions in the optical fibre coil, each secondary beam travelling through the coil with a travel time τ defining a natural frequency of the coil $$f_p = \frac{1}{2\tau};$$

modulating a phase difference between the two secondary beams at a phase-modulation frequency equal to $$\frac{f_p}{2n+1};$$

optically recombining the two secondary beams at the exit of the optical fibre coil to form an interference beam; and detecting the interference beam incident on a photodetector, wherein the method comprises a step of:

modulating the source beam at a modulation frequency equal to $$\frac{2f_p}{2n+1}$$

where n is a natural integer number greater than or equal to 1; and the detection of the interference beam being made using a demodulation frequency equal to $$\frac{f_p}{2n+1}.$$

* * * * *